J. F. SMITH & A. W. MOUNSDON.
Iron Fence.
No. 223,400.  Patented Jan. 6, 1880.
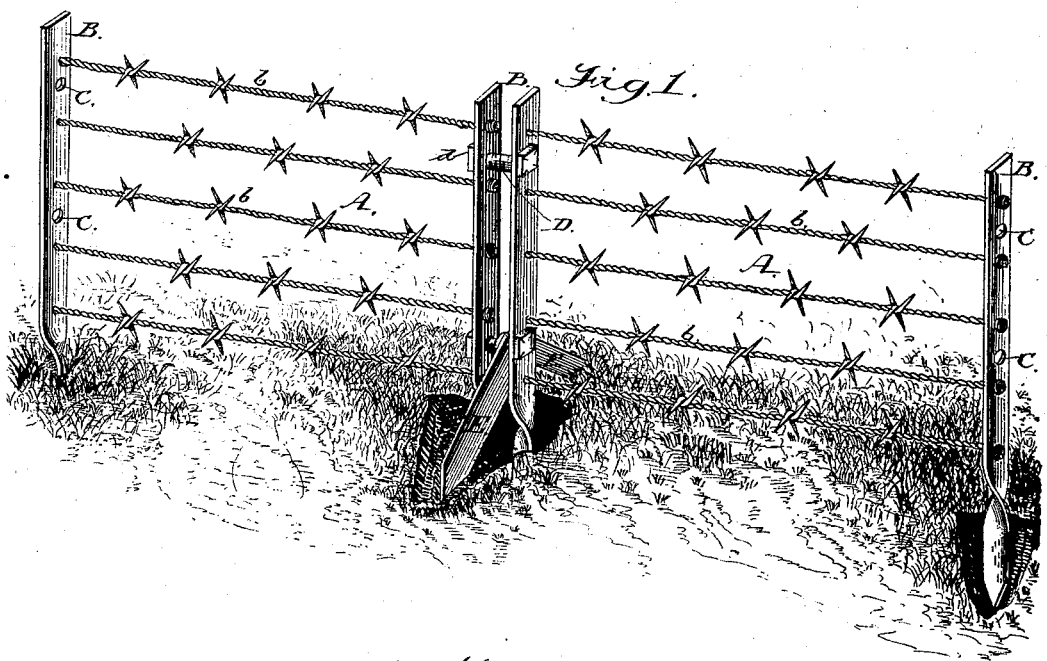
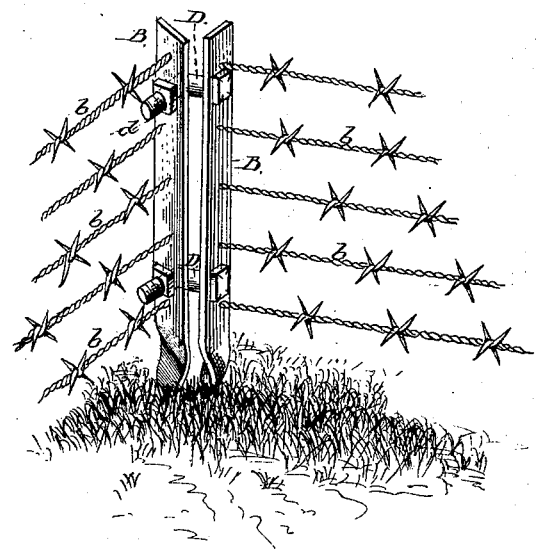

UNITED STATES PATENT OFFICE.

JAMES F. SMITH AND ALBERT W. MOUNSDON, OF TOLEDO, IOWA.

IRON FENCE.

SPECIFICATION forming part of Letters Patent No. 223,400, dated January 6, 1880.

Application filed August 8, 1879.

*To all whom it may concern:*

Be it known that we, J. F. SMITH and A. W. MOUNSDON, of Toledo, in the county of Tama and State of Iowa, have invented certain new and useful Improvements in Iron Fences; and we do hereby declare the following to be a full, clear, and exact description thereof, reference being had to the accompanying drawings, making a part of this specification, and in which—

Figure 1 is a perspective view of the fence. Fig. 2 shows a corner of the fence as constructed.

The object of our invention is to provide a removable metal fence any section or panel of which may be removed without interfering with the adjoining sections, or which can be conveniently removed section by section from one locality to another, if desired; and the improvement consists in the combination of devices, as will be hereinafter described and claimed.

To enable others skilled in the art to make and use our invention, we will proceed to describe the exact manner in which we have carried it out.

In the drawings, A A represent sections or panels of our improved fence, each composed of the posts B B, of metal, each having a one-half twist near the lower end, which is pointed to be easily driven into the ground, and a series of longitudinal barbed or plain wires, b b, their ends passing through the small holes in the posts, where they are fastened by nails or rivets, and a twist taken with the wire around the nails or rivets before driving too tight, which forms a secure fastening for the wires, so that they are unable to slip their hold, no matter how tight they are drawn. The posts B B are also provided with two or more larger holes, C C, through which pass the bolts D D for connecting the sections or panels together, said bolts being provided with screw-nuts d d, by which they are secured therein. The bolts D D also pass through the ends of pointed metallic inclined braces E E, which, together with the half-twist in the posts, enables the fence to resist all lateral strain against the posts.

Wire fences are generally composed of four wires. In the present instance we have shown it composed of five wires; but by leaving out the lower wire we have a perfect fence of four wires, or by leaving out the intermediate wires we provide a fence of three wires.

The bolts connecting the sections together should be of such length and size as to permit of short turns, and for square corners the bolt should be provided with a square bend, as shown in Fig. 2.

The fence will come in sections or panels from the manufacturer; and to put up the same, take a section and set it on the line and drive the posts so as to bury about one-half of the twist in the ground. The braces are then driven on each side of the section until the bolt-holes are in line with the lower bolt-holes, C, in the post. A second section is then placed on the line adjacent to the first section and the posts driven into the ground until the bolt-holes are in line with those of the adjacent post. The bolts D D are then passed through the holes in the posts and the intermediate braces, and this operation is continued until the fence is erected, after which we go back and secure the nuts on the bolts with a wrench, which tightens the wires as much as desired.

The sections or panels may vary in length as desired.

The fence can be moved, when desired, for a change of cattle-pasture. It is also very convenient for fencing in grain, hay, or straw stacks; or, when it is desired to make a short cut, a temporary gateway or passage can be made by taking out a panel.

We are aware of the existence of Patent No. 153,390, and do not claim as our invention anything therein described or claimed.

Having thus fully described our invention, we claim as new and desire to secure by Letters Patent—

In a wire fence, the combination, with the corner-posts B B of the panels provided with the bolt-holes c c, of the bolts D D, provided with the square bends and the nuts d d, substantially as and for the purpose herein shown and described.

JAMES F. SMITH.
ALBERT W. MOUNSDON.

Attest:
GEO. L. BAILEY,
J. Q. CLARKE.